Oct. 6, 1959 T. H. BONN 2,907,894

MAGNETIC GATING ON CORE INPUTS

Filed March 29, 1955

5 Sheets-Sheet 1

INVENTOR

THEODORE H. BONN

BY

Charles E. English

AGENT

Oct. 6, 1959

T. H. BONN 2,907,894

MAGNETIC GATING ON CORE INPUTS

Filed March 29, 1955

5 Sheets-Sheet 2

INVENTOR

THEODORE H. BONN

BY *Charles C. English*

AGENT

Oct. 6, 1959 T. H. BONN 2,907,894

MAGNETIC GATING ON CORE INPUTS

Filed March 29, 1955

5 Sheets-Sheet 3

INVENTOR

THEODORE H. BONN

BY Charles C. English

AGENT

Oct. 6, 1959 T. H. BONN 2,907,894

MAGNETIC GATING ON CORE INPUTS

Filed March 29, 1955

5 Sheets-Sheet 4

INVENTOR

THEODORE H. BONN

BY Charles C. English

AGENT

Oct. 6, 1959 T. H. BONN 2,907,894

MAGNETIC GATING ON CORE INPUTS

Filed March 29, 1955

5 Sheets-Sheet 5

INVENTOR

THEODORE H. BONN

BY *Charles C. English*

AGENT

United States Patent Office 2,907,894

Patented Oct. 6, 1959

2,907,894

MAGNETIC GATING ON CORE INPUTS

Theodore H. Bonn, Philadelphia, Pa., assignor, by mesne assignments, to Sperry Rand Corporation, New York, N.Y., a corporation of Delaware Application March 29, 1955, Serial No. 497,727

17 Claims. (Cl. 307—88)

This invention relates to gating and buffing circuits and more particularly to such circuits adapted for use as components of computing or data translating systems employing magnetic amplifiers.

Heretofore, gating circuits have employed diodes as the principal circuit components, but diodes are likely to fail and it is desirable to reduce the number of them required so far as possible. It is an object of the present invention to reduce the number of diodes required in a gating circuit and to replace some of the diodes with more reliable control devices.

The principal object of this invention is to provide a gating circuit which will operate in a system, the principal components of which are magnetic amplifiers.

Another object of this invention is to provide a gating system that is low in cost.

An additional object of the invention is to provide a gating circuit in which the component parts include magnetic amplifiers, whereby the advantage of that type of component is obtained.

Another object of this invention is to provide a gating circuit that is very efficient and effective in operation.

It is well known that most present-day computing or data translating systems employ vacuum tubes. It is also known that computer engineers are perfecting computers (and data translating systems) employing magnetic amplifiers as the principal components thereof. The present invention will have limited applications to such computing or data translating systems. However, the main purpose of the present invention is to provide a new gating system that may be combined with other systems of the same general type to form a new and simpler computer or data translating system than has heretofore been possible.

It is a further object of the invention to provide a magnetic gating circuit in which the gating is accomplished on the core inputs.

Another object of the invention is to provide a magnetic gating circuit in which a plurality of inputs so control the core as to determine the output.

The present invention uses magnetic amplifiers having a plurality of input coils so connected with the source of signal or control pulses and with a source of power pulses that the power pulses are gated in accordance with the control signals appearing on a predetermined number of the core inputs. The invention involves detailed circuits for this purpose, these circuits being different depending upon the particular application with which they are adapted for use. Typical details of these circuits are shown in several of the figures of the attached drawings.

This application is a continuation-in-part of my prior copending application Serial No. 461,968, filed October 13, 1954, entitled "Gating Circuits Employing Magnetic Amplifiers," assigned to the same assignee as the present application. The essential difference between the subject matter claimed in the parent application and the subject matter claimed in this one is that here there are a plurality of inputs on each core, and the apparatus is so constructed and arranged that a predetermined number of these core inputs must be energized in order to secure a particular output.

Figure 1:
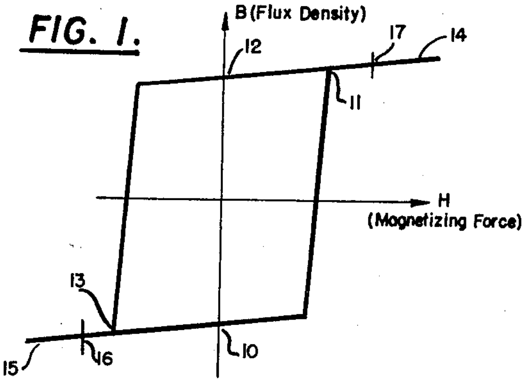
Figure 1 is an idealized hysteresis loop for the material used in the cores of this application.

The magnetic cores of the several devices hereinafter described can be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 1). Cores of this character are now well known in the art. In addition to the wide variety of materials available, the core may be constructed in a number of geometries, including both closed and open paths; for example, cup-shaped, strips and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coil on the core will be high.

Figure 2:
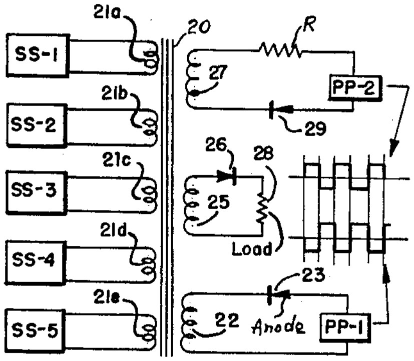
Figure 2 is a schematic diagram of a simple form of the invention.

Figure 2 illustrates one form of gating on the core input. The core 20, which may be composed of the materials hereinabove specified, and of any of the shapes specified, has a plurality of input coils 21*a* to 21*e* inclusive, respectively coupled to a plurality of signal sources SS–1 to SS–5 inclusive. The source PP–1 generates a squarewave alternating current which, during positive half cycles, flows through the rectifier 23 and coil 22 tending to magnetize the core positively. The load 28 is connected to the secondary coil 25 through the rectifier 26. Load 28 has been shown as a resistor for purposes of simplification. In a more complete system, a plurality of magnetic gating devices would be present and the output of one gating device would act as the signal input source for selected other ones of said plurality of magentic gating devices. It is to be understood that while loads have been shown as resistors in each of the embodiments hereinafter described, this is intended to be exemplary of the connection above described. Another coil 27 on the core is normally energized by a source of pulses PP–2 energized through rectifier 29 and through resistor R.

For the purpose of preliminary discussion, it will be assumed that coil 27, source PP–2, resistor R and rectifier 29 are omitted. In the absence of any input to coils 21*a*–21*e* from sources SS–1 to SS–5, positive pulses from source PP–1 flowing through coil 22 drive the core 20 from remanence point 12 to saturation at point 14 on the hysteresis loop of Figure 1 and since the rate of change of flux in coil 25 is small, no current flows in the load 28. However, if during a period when source PP–1 is going negative, any one of the sources SS–1 to SS–5 inclusive produces a pulse through its complementary primary coil 21*a* to 21*e* inclusive, the core will be reverted to point 13 on the hysteresis loop and at the end of this signal pulse the core will return to negative remanence point 10. Hence, the next positive going pulse from source PP–1 drives the core along the unsaturated portion thereof from point 10 to point 11 of Figure 1. This will induce a potential in coil 25 and cause a substantial flow of current to the load 28, thus giving an output. It is clear, therefore, that any one or more of the signal sources SS–1 to SS–5 inclusive may cause an output to appear at load 24 by producing a signal pulse during an interval when the source PP–1 is going negative. In a more complete system, the signal sources SS–1 to SS–5 inclusive would include means whereby they could deliver pulses to their respective input coils only during the negative going excursions of source PP–1. Suitable signal sources meeting this qualification are obvious to those skilled in the art and one way of accomplishing this result is shown in said prior copending applications.

The pulses from source PP–2 flow through rectifier 29 during the periods when rectifier 23 blocks the pulses from source PP–1, and vice versa. The pulses of source PP–2 flowing through rectifier 29 tend to bias the core to point 17 on the hysteresis loop of Figure 1. During the spaces between pulses of source PP–2, pulses from source PP–1 flowing through coil 22 tend to drive the core positively also and therefore drive it to saturation. In such situations, the rate of change of flux in the core is small and very little potential is induced in the output coil 25, and hence for practical purposes there is no output at the load 28. The coils 21*a* to 21*e* inclusive may be energized concurrently with the passage of current from source PP–2 through rectifier 29 to the coil 27. Moreover, it may be arranged that a single one of the sources SS–1 to SS–5 inclusive is inadequate to overcome the positive magnetizing force of source PP–2. In such cases even the energization of one signal source SS–1 to SS–5 would be inadequate to drive the core negatively. The circuit may be arranged so that any predetermined number of the signal sources SS–1 to SS–5 inclusive must be concurrently energized during an interval when source PP–2 is passing current through rectifier 29. For example, assume that it is required that all five signal sources be so energized, then if all five are so energized, the positive magnetizing force of source PP–2 will be overcome and the core will be driven negatively to point 13, for example, when the five signal sources supply signals to coils 21*a* to 21*e* inclusive. During the spaces between signals of said sources SS–1 to SS–5 inclusive, the source PP–1 will supply current through rectifier 23 to coil 22 and drive the core positively to point 11 on the hysteresis loop. Hence, on one half of the cycle the core will be driven positively from point 13 to point 11 and on the other half of the cycle the core will be driven around the other half of the hysteresis loop negatively from point 11 to point 13. Since the core will be traversing unsaturated portions of the hysteresis loop, there will be a large rate of flux and a large potential induced in coil 25.

Figure 3:
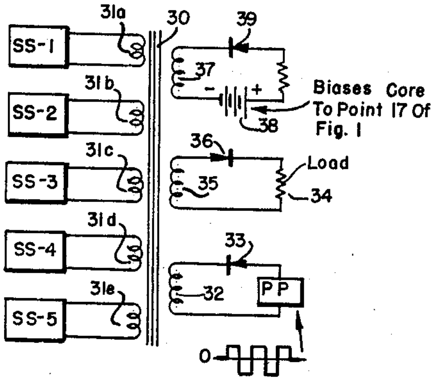
Figure 3 is a schematic diagram of a modified form of the invention.

In Figure 3, the apparatus is substantially the same as in Figure 2 except for the biasing arrangement. Coils 31*a* to 31*e*, 32, 35 and 37 respectively are identical with corresponding coils 21*a* to 21*e*, 22, 25 and 27 of Figure 2. Source PP of Figure 3 functions the same as source PP–1 of Figure 2. Rectifier 33, resistor 34 and rectifier 36 of Figure 3 functions the same as rectifier 23, load 24 and rectifier 26 of Figure 2. The essential difference between these two figures is that in Figure 3 the source of bias is a direct current source 38 tending to drive the core to point 17 on Figure 1. For purposes of further discussion, assume that the magnetizing force due to battery 38 is equal and opposite to that of each signal source SS–1 to SS–5 inclusive. Then, if none of the signal sources are energized, the core will be at point 17 at the start of the operation and successive power pulses from source PP will successively drive the core from point 17 to saturation point 14 (Figure 1) and no current will flow in the load 34. If, while the source PP is going negative, just one signal source energizes its complementary coil, for example source SS–1 and coil 31*a*, the magnetizing force due thereto will exactly counteract that due to battery 38 and the core will return to remanence point 12 during the spaces between positive power pulses of source PP. Nevertheless, successive positive pulses of source PP will successively drive the core from point 12 to point 14 along an essentially saturated portion of the hysteresis loop, and therefore the potential induced in coil 35 due to the change in flux will be nominal. It requires the energization of at least two signal sources concurrently in order to get an output at the load 34. If any two of the signal sources simultaneously energize their complementary input coils (31*a* to 31*e* inclusive) during a negative going excursion of source PP, the core will be reverted to point 16. This follows from the fact that one of the signal sources will cancel the effect of battery 38, thus returning the core to positive remanence 12, and the other signal source will revert the core from point 12 to point 13. At the end of the signal pulse period, the next positive pulse from source PP will drive the core from point 10 to point 11 along an unsaturated portion of the hysteresis loop thereby producing an output at load 34. If, during the next negative going excursion of source PP, any two of the signal sources are concurrently energized, the core will again be reverted to point 13 and the next positive pulse from source PP will cause another output current to flow in load 34.

Figure 4:
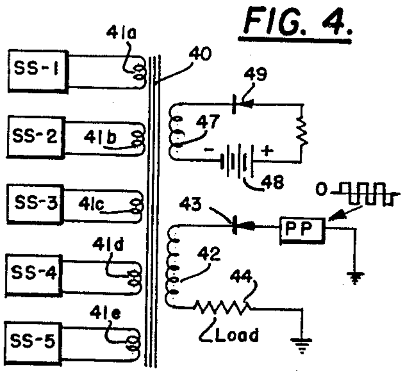
Figure 4 is a schematic diagram of a further modified form of the invention.

Figure 4 is a modified form of Figure 3, in which the parts 40, 41*a* to 41*e* inclusive, 47, 48 and 49 are respectively identical in construction and mode of operation to parts 30, 31*a* to 31*e*, 37, 38 and 39 of Figure 3. The only difference between Figures 3 and 4 is in connection with the delivery of pulses from source PP to the load. In Figure 3, when the core was operating on an unsaturated portion of its hysteresis loop, potential was induced in coil 35 and a current would then flow to the load. In Figure 4, there is no substantial current flow to the load when the core is operating on the unsaturated portion of the hysteresis loop since at that time the coil 42 has high impedance and therefore no substantial current may flow from source PP, rectifier 43, coil 42 to the load 44. However, whenever the core 40 is operating on a substantially saturated portion thereof, coil 42 has low impedance and pulses may readily flow from source PP to the load 44.

Therefore in Figure 4, when the signal sources are all de-energized, the core 40 is biased to point 17 on the hysteresis loop and power pulses from source PP flowing through coil 42 will drive the core from point 17 to saturation point 14 and enable large pulses to flow in the load 44. On the other hand, when a plurality of the signal sources are energized so that the core is reverted to point 16 during each negative going excursion of source PP, the positive pulses of source PP will drive the core along an unsaturated portion thereof between 16 and 11, and during this operation the coil 42 has high impedance and substantially no current flows to the load 44.

Figure 5:
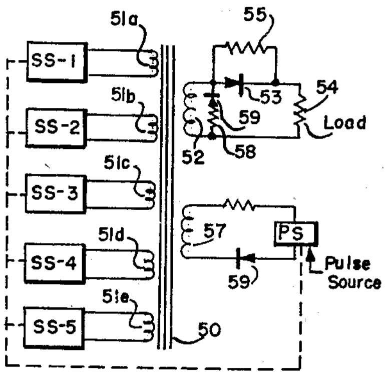
Figure 5 is a schematic diagram of another form of the invention.
Figure 5A:
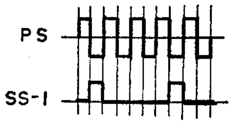
Figure 5A is a timing diagram useful in explaining Figure 5.

Figure 5 is a modified form of the invention, in which the core 50 is preferably composed of the materials hereinbefore specified but may be composed of ordinary transformer material. The signal sources SS–1 to SS–5 supply currents to their complementary coils which, by transformer action, induce potential in secondary 52 which may cause a flow of current in the load 54. In other words, the device is similar to an ordinary transformer with a plurality of primaries, but with, preferably, square hysteresis loop material. As in connection with other forms of the invention, the signal sources SS–1 to SS–5 produce signals only at predetermined times. For example, as shown in Figure 5A, signal source SS–1 produces pulses in coil 51*a* when pulse source PS applies a negative potential to the anode of rectifier 59. The other signal sources SS–2 to SS–5 also produce signals only when source PS applies a negative potential to the anode of rectifier 59. When source PS applies a positive potential to the anode of rectifier 59 (hereinafter referred to as a "positive excursion") it energizes coil 57 to produce a negative magnetizing force. The signal sources SS–1 to SS–5, when energized, produce positive magnetizing forces in core 50. If one or more of the signal sources SS–1 to SS–5 produce signals during a given negative excursion of source PS a potential will be induced in output coil 52. Current will then flow to load 54. The next positive excursion of source PS returns the core to negative remanence. Until there is another signal from one of sources SS–1 to SS–5 the positive going pulses of source PS will drive the core from negative remanence to negative saturation giving no output, since the change of flux in the core is nearly zero.

The source PS along with coil 57 may be omitted in the event ordinary transformer core material is employed, and in that case it may be desirable to place a resistor 55 across rectifier 53 to provide a closed circuit to current in both directions; whereby to prevent repeated energizations of the signal sources from working the core up the hysteresis loop. Instead of resistor 55 the resistor 58 and rectifier 59 could be used to prevent the core from being worked up the hysteresis loop to saturation. It is, of course, possible to employ resistor 55 as well as resistor 58 and rectifier 59. It is also possible to employ all of these parts in conjunction with winding 57 and source PS. Normally, however, it is necessary to use only one of these three schemes for preventing the signal pulses from working the core up the hysteresis loop, namely one of (*a*) source PS and coil 57, (*b*) resistor 55 across rectifier 53, or (*c*) resistor 58 and rectifier 59.

Figure 6:
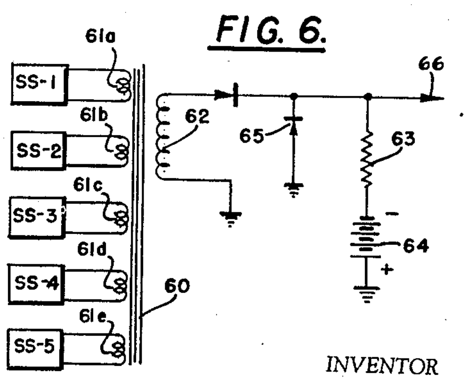
Figure 6 is a schematic diagram of still another form of the invention.

Figure 6 is a modified form of Figure 5 in which the core 60 is composed of, for example, ordinary silicon steel instead of special core material. Here again the signal sources are arranged to be energized only at predetermined times and one or more of them may energize its complementary coil with short pulses concurrently, depending on the operation of the whole computing system. When there is an energization of one of the input coils 61*a* to 61*e*, there is a magnetizing force on the core 60 tending to change the flux therein. When the flux changes through coil 62, a potential is, of course, induced therein. Resistor 63, battery 64 and rectifier 65 are so connected that a constant current normally flows from battery 64 to ground then to rectifier 65 and to resistor 63. Until a current flowing through coil 62, due to potential induced in that coil, builds up equal to the constant current in the circuit 63—64—65, there will be no output. However, if a sufficient number of the signal sources SS–1 to SS–5 inclusive are concurrently energized, the current in coil 62 may build up to such a high value that it will exceed the current flowing in 63—64—65, and thus produce an output at a load coupled, for example, to point 66. By suitable design, it may be arranged that a single one of the signal sources may produce the necessary input current to effect an output at the said load; or it may be arranged that at least two of the signal sources must be concurrently energized. In the alternative, it may be arranged that one of the signal sources can alone produce enough change of flux to effect an output at the said load, while the others will not. If desired, the device may be so designed that all five signal sources may be concurrently energized before there will be a flow of current at the load.

Figures 7, 9:
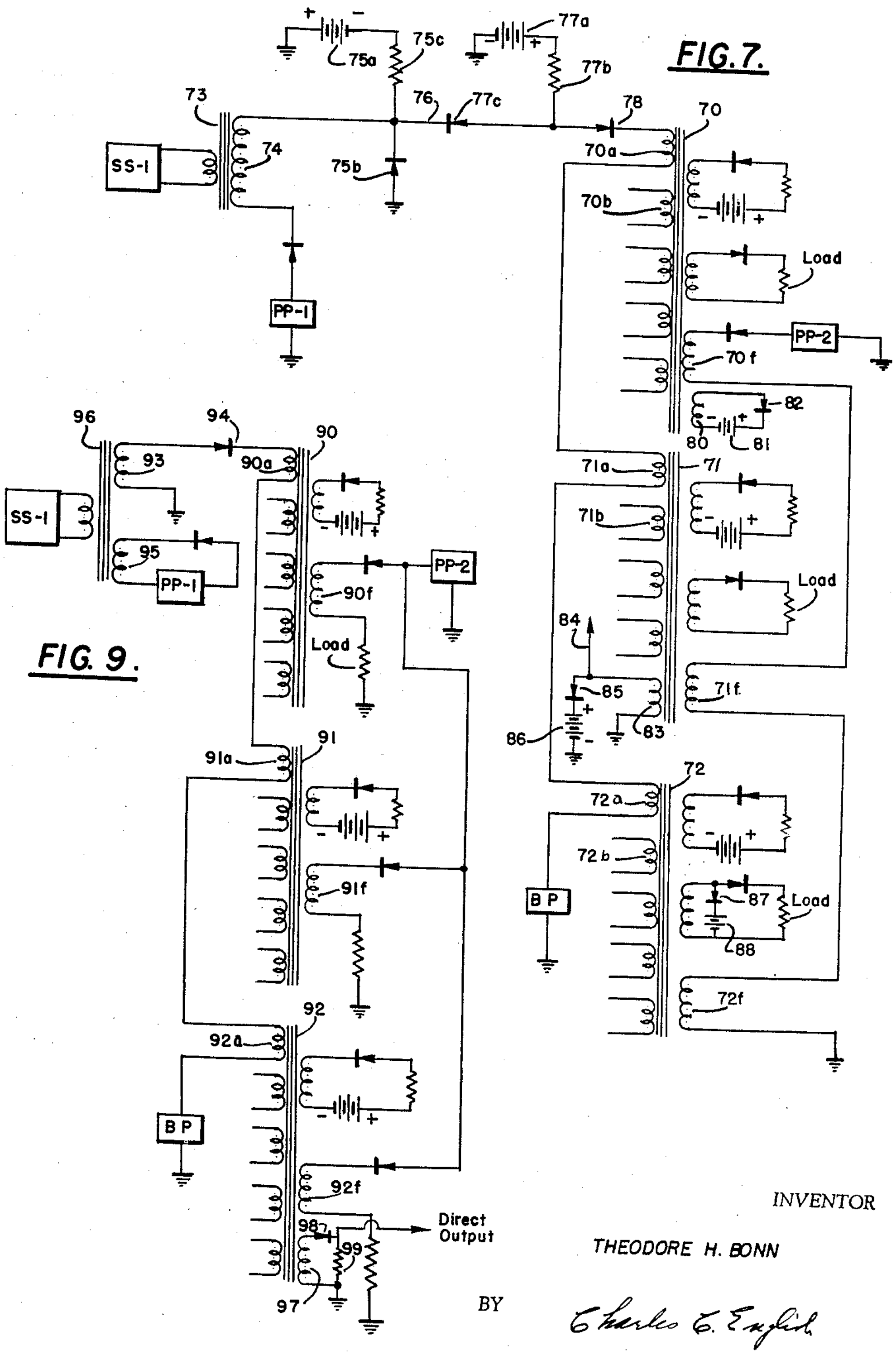
Figure 7 is a schematic diagram showing how a plurality of devices such as are shown in Figure 3 may be controlled from a single signal source.
Figure 9 is another illustration of how a plurality of gating circuits of the type shown in Figure 4 may be interconnected and controlled by a certain signal source.

In Figure 7 there are three magnetic gating systems, 70, 71 and 72, which are identical in all substantial respects with the device of Figure 3 and therefore need not be explained in any detail except to merely state that a single source of power pulses PP–2 can serve all three of the power windings 70*f*, 71*f* and 72*f* of these gates. Figure 7 is an elementary teaching of how a plurality of gating circuits of the type shown in Figure 3 may be interconnected. A signal source SS–1 may control all three coils 70*a*, 71*a* and 72*a* of the three gates. The input coils 70*b*, 71*b* and 72*b* may be controlled by three separate sources, or by another control system the same as is employed in connection with input coils 70*a*, 71*a* and 72*a*.

As stated in connection with prior figures, the inputs to the coils should occur during the negative going excursions of the source of power pulses and consequently, in this figure, two sources of power pulses, PP–1 and PP–2, are shown.

Figures 8, 10:
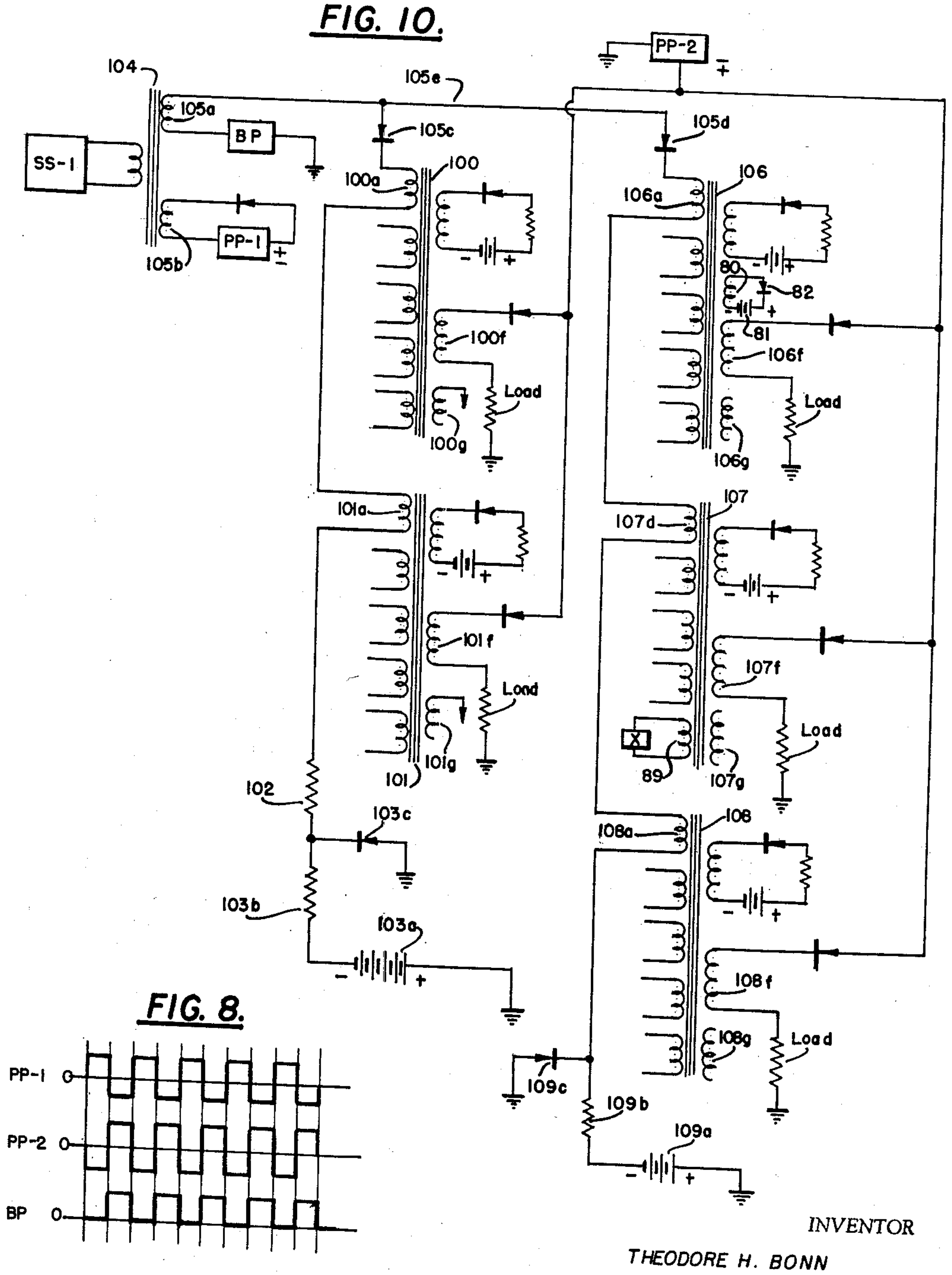
Figure 8 is a waveform diagram for the device of Figure 7.
Figure 10 is a further illustration showing how gating circuits of the general type shown in Figure 7 may be interconnected with each other.

Figure 8 illustrates that the pulses of source PP–1 of Figure 7 go positive during the same intervals that those from source PP–2 go negative, and vice versa. Therefore, since these two sources have rectifiers in series with them, source PP–1 can energize the input coil 70*a*, 71*a* and 72*a* only during negative going excursions of source PP–2. The magnetic amplifier 73 may have a coil 74 which has high or low impedance as the case may be, to any given positive pulse from source PP–1, depending on the prior energization of the signal source SS–1, in accordance with previously disclosed principles. A battery 75*a* tends to pass current from ground through rectifier 75*b* and resistor 75*c*, thereby tending to hold wire 76 at ground potential. Battery 77*a* tends to pass a current through resistor 77*b*, rectifier 77*c*, resistor 75*c* and battery 75*a*. When coil 74 has high impedance the potential of battery 77*a* appears across resistor 77*b* and hence wire 76 remains at ground potential. If, however, a positive pulse from source PP–1 finds low impedance in coil 74, it will raise the potential of wire 76 to a high positive value and current from battery 77*a* now flows through resistor 77*b* and the three coils 70*a*, 71*a* and 72*b* in series, to the source of blocking pulses BP and thence to ground. Hence, all three coils are energized during a negative going excursion of source PP–2 and thereby perform the desired controlling effect on the three gates 70, 71 and 72. As a result, the single signal source SS–1 can concurrently control all three coils 70*a*, 71*a* and 72*a*. The remaining coils on the gates 70, 71 and 72 may be controlled in this manner or in any other suitable way so that they also become effective from time to time. The source of blocking pulses BP prevents any potentials induced in the coils 70*a* to 72*a*, due to variations in the flux of the cores resulting from source PP–2, from causing a flow of current in the input circuit. This follows from the fact that the positive blocking pulses from source BP acting on the cathode of rectifier 78 cut off that rectifier so that no current can flow through it. In this device, the signal source SS–1 should normally produce its control signals during those intervals when source PP–1 is going negative so that it will effectively control the positive going pulses of source PP–1. It is the latter which occur during the negative going excursions of source PP–2 and thus control the three magnetic amplifiers.

It is understood that each of cores 70, 71 and 72 have a number of separate inputs, for example core 70 has five input coils of which 70*a* and 70*b* are examples. In a complete computing or data translating system it may be that a number of these input coils are energized simultaneously. In some instances it may be that all five coils were energized simultaneously while perhaps say three coils of core 71 and only one coil of core 72 were simultaneously energized. In this case the available flipping magnetizing force for core 70 would be far greater than enough to flip the core and would tend to flip the core very rapidly. Likewise, the flipping magnetizing force of core 71 would be very great and would tend to flip that core rapidly but not as rapidly as 70. On the other hand, the flipping magnetizing force of core 72 would be just sufficient to flip the core. It is clear, therefore, that some of the cores would be flipped before others and would reach a state of saturation and thus the impedances of their input coils changed during the flipping. In some computing or data translating systems this result is undesirable, and it may be eliminated in any one of several ways. For example, a coil 80 may be added to the core 70 and connected in series with battery 81 and rectifier 82 with the positive pole of battery 81 connected to the cathode of rectifier 82. As long as the rate of change of flux in the core 70 is below the desired value, the potential induced in coil 80 will be insufficient to overcome the potential of battery 81 and no current will flow through rectifier 82. However, if the rate of change of flux in core 70 exceeds the desired value, the potential induced in coil 80 will exceed the potential in battery 81 and in effect the coil 80 will be short-circuited by the rectifier 82 and limit the rate of change of flux to the desired value.

The same result as just described may be accomplished without adding another coil to the core. For example, one of the input coils 83 of Figure 7 may serve both as an input coil and as means for limiting the rate of change of the flux. In this case, the input coil 83 is connected to its desired input circuit through wire 84. It is also connected through rectifier 85 to battery 86. Until the rate of change of flux in the core 71 induces a potential in coil 83 which overcomes the potential of the battery 86, the circuit 83–85–86 will have no effect but when the rate of change of flux exceeds the desired value a current will flow in the circuit 83–85–86 and limit the rate of change of flux.

Another way of accomplishing the same result is shown in connection with core 72 where rectifier 87 and battery 88 are connected across the output winding. As long as the rate of change of flux is below the desired value, the potential induced in the output coil will not overcome the potential of battery 88 and no current will flow through the rectifier 87. However, if and when the rate of change of flux exceeds the desired value current will flow through rectifier 87 and battery 88 and limit the rate of change of flux to the desired value.

In Figure 9, three magnetic gates 90, 91 and 92 are the same as the magnetic gates of Figure 4. The power windings 90*f*, 91*f* and 92*f* of these gates are fed with pulses from source PP–2 and furnish current to the load when the core operates along a saturated portion thereof during a positive going excursion of source PP–2. Except for the fact that the gates of Figure 7 conform to Figure 3, whereas the gates of Figure 9 conform to Figure 4, the operation of the gates and their interconnection is essentially the same in Figures 7 and 9. The basic distinction between Figures 7 and 9 is in the means for energizing the three input coils 90*a*, 91*a* and 92*a*. In Figure 9, the sources PP–1, PP–2 and BP have waveforms as shown in Figure 8. The magnetic amplifier 96 is of the parallel type having an output coil 93 operating through rectifier 94. In event signal source SS–1 reverts the core 92 during a space between two positive excursions of source PP–1, the next positive pulse from source PP–1 will energize the coil 95 and drive the core along an unsaturated portion thereof and induce potential in coil 93 which will flow through rectifier 94 and through all three coils 90*a*, 91*a* and 92*a* in series. The other coils of the gates 90, 91 and 92 may be energized by input circuits like that shown for coils 90*a*, 91*a* and 92*a*, or they may be energized in any of a wide variety of other ways as required to form the desired computing function. The source of blocking pulses BP goes positive when source PP–2 goes positive and it cuts off rectifier 94 and thereby prevents potential which is induced in the input coils 90*a* to 92*a* effecting current flow in the input circuit. In the event that both direct and complement outputs are desired from a gate, the means comprising direct output winding 97, rectifier 98, and exemplary load resistor 99 may be employed. An output will be induced in direct output coil 97 whenever core 92 is operated on an unsaturated portion of the hysteresis loop by the application of a positive going pulse from source PP–2 to complement output winding 92*f*. While this direct output circuit has been shown only in conjunction with core 92, it is to be understood that it may be employed in conjunction with any of the active gating devices herein described.

Figure 10 illustrates how a plurality of groups of devices of the same character as shown in Figure 4 may be controlled by a single signal source SS–1. There are three sources of pulses PP–1, PP–2 and BP, which have the same waveforms as shown in Figure 8, except that source BP goes negative in Figure 10 wherever it goes positive in Figure 8. When blocking pulse source BP goes negative it renders the anodes of rectifiers 105*c* and 105*d* negative and therefore cuts off these rectifiers and prevents flow of any current in the coil 105*a*. A plurality of magnetic gates 100, 101, 106, 107 and 108 have the same construction and mode of operation as is shown in conjunction with Figure 4, and it is the purpose of this figure of the drawing to show how those five gating systems may be interconnected and controlled by the source SS–1.

There are three gates in the group, 106, 107 and 108, and only two in the group 100–101. However, there could be the same number in either case. Instead of a third gate in the group 100–101, there is resistor 102 that takes the place of the third gate. The core 104 is energized by spaced positive pulses from source PP–1 which flow through coil 105*b*. When the core 104 is operating on an unsaturated portion, potential is induced in the secondary 105*a*. During this interval there is no potential from source BP. However, during the spaces between pulses of source PP–1, the source BP goes negative and prevents flow of any current in the coil 105*a*. Signal source SS–1 controls the input coil of the core 104 and thus determines the region of the hysteresis loop on which the core operates during each pulse from source PP–1; all in the previously disclosed manner. Battery 103*a* tends to pass the current through resistor 103*b* and rectifier 103*c*. Similarly, battery 109*a* tends to pass current through resistor 109*b* and rectifier 109*c*. These currents are substantially constant currents. Source PP–2 tends to pass current through coils 100*f*, 101*f*, 106*f*, 107*f* and 108*f* to the loads respectively connected to those coils. When any one of said coils has low impedance, current will flow from source PP–2 to the complementary load on the positive half of the cycle. The impedance of the coils is controlled in the same way described in conjunction with Figure 4. When the core 104 is operating on a saturated portion of its hysteresis loop during the periods of a pulse from source PP–1, there is no substantial potential on wire 105*e*, and hence no current flows in any of the coils 100*a*, 101*a* and 106*a*, 107*a* and 108*a*. On the other hand, when the core 104 is operating on an unsaturated portion thereof during the period of a pulse from source PP–1, wire 105*e* rises to a high positive potential, whereupon current flows in coils 100*a*, 101*a*, 106*a*, 107*a* and 108*a*, thus energizing these coils of said gates. The other coils of the several magnetic gates may be controlled in similar ways by other similar signal sources similar to SS–1, or they may be controlled by other parts of the entire computing system. Direct current sources 103*a* and 109*a* limit the input coil currents to values determined by resistors 103*b* and 109*b*, respectively.

The rate of change of flux in the several cores of Figure 10 may be limited by any of the several means described in connection with Figure 7. For example, coil 80, battery 81 and rectifier 82 may be added to any one or more of the cores and these parts will function the same as the parts bearing the same reference numbers of Figure 7. A still further way of limiting the rate of change of flux in the core is shown in connection with core 107 where a non-linear resistor X is shunted across coil 89. Any of the coils on the core could be used. This non-linear resistor can be of the type known as Thyrite in which the resistance is inversely proportional to the 4th power of the potential. When the potential induced in the input coil 89 does not exceed the desired value, very little current flows in resistor X. When the potential is above the desired value, the resistor X rapidly acquires low resistance and tends to regulate the potential induced in the coil 89 and thereby regulates the rate of change of flux in the core. As a result, the rate of change of flux in the core is, for practical purposes, limited to the desired value although in this case any large increase in the input magnetizing forces will increase the magnetizing forces in the core.

Figures 11, 12:
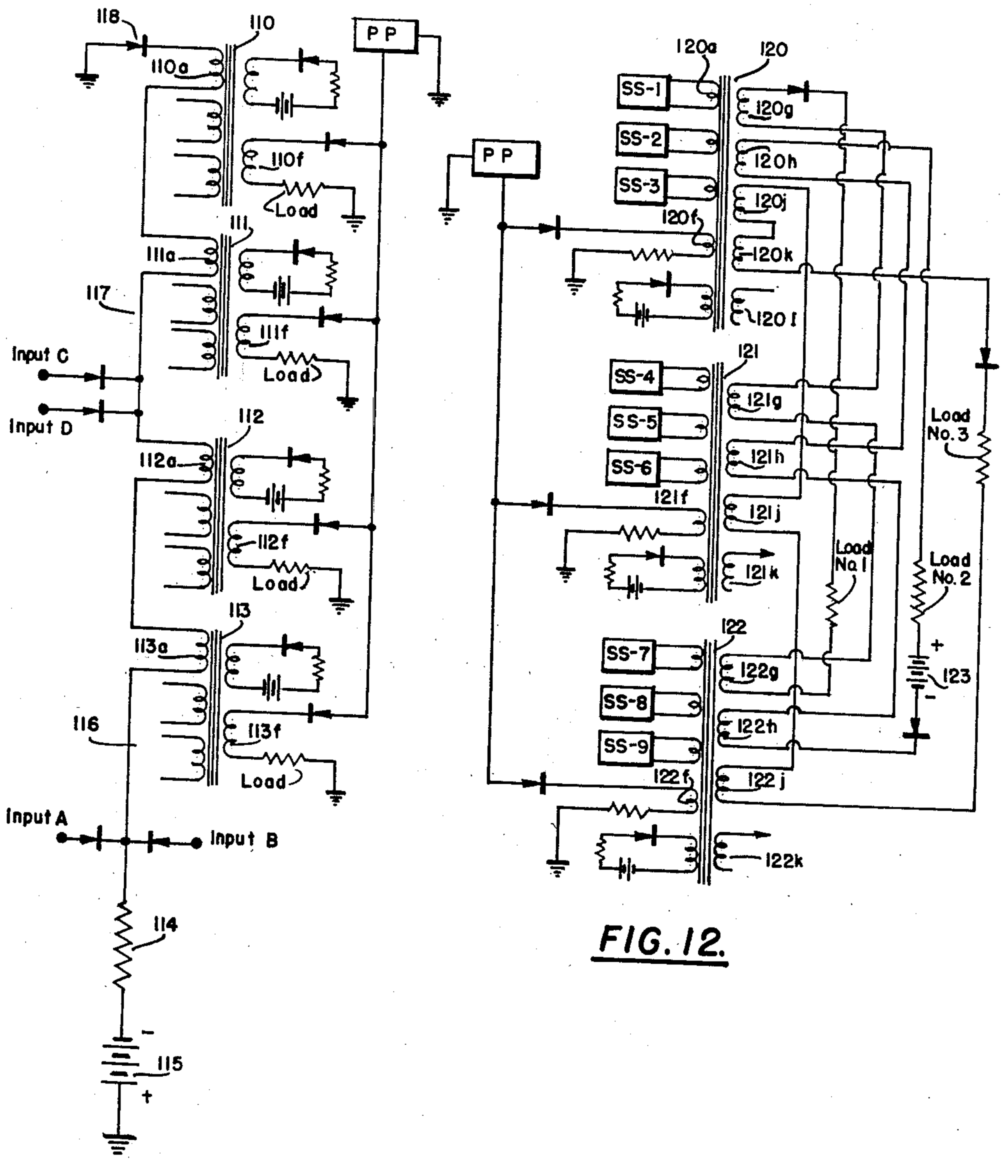
Figure 11 is a schematic diagram of a further modified way of interconnecting gating circuits of the type shown herein.
Figure 12 is a schematic diagram of a plurality of gating circuits so interconnected that the energization of the load indicates whether or not any particular group or combination of groups of signal sources is energized.

Figure 11 is a modified form of the invention in which four inputs A, B, C and D are operable to determine which of two groups of magnetic gates have outputs. The first group may include gates 110 and 111 and the second group includes magnetic gates 112 and 113. All of these magnetic gates are similar in construction and mode of operation to those in Figure 4. In event none of the four inputs A, B, C and D is energized, current will flow from ground, through rectifier 118 coil 110*a*, coil 111*a*, coil 112*a*, coil 113*a*, resistor 114 and battery 115. Hence, the four input coils of the four gates will be concurrently energized. If a positive potential appears at either input A or input B or at both of these inputs, no current will flow in any one of the four coils, 110*a*, to 113*a*, since rectifier 118 is blocked.

If the device to which input C is connected effectively connects that input to ground, current will flow in coils 112*a* and 113*a* only. Hence, the two magnetic gates of the second group will have their inputs energized, whereas the two magnetic gates of the first group will not. The output circuits of the gates of Figure 11 operate the same as in connection with Figure 4, that is, when the coils 110*f*, 111*f*, 112*f* or 113*f* have low impedance, current will flow from source PP through the low impedance coil to the complementary load. When these coils have high impedance, little, if any, current will flow to the load. The input coils function the same as in Figure 4, and biasing means may be employed the same as in connection with either Figures 2 or 4.

In Figure 12 there are plurality of signal sources SS-1 to SS-9 inclusive divided into three groups of three sources each, and three loads, load #1, load #2 and load #3. Each of the magnetic gating systems has a core as well as suitable biasing means such as shown in conjunction with Figures 2 or 4, applying a biasing magnetizing force to the core. The input windings, such as 120*a*, are connected to their complementary signal sources, and they in conjunction with the biasing source, determine the reverting of the core during the spaces between pulses of source PP. That source tends to energize coils 120*f*, 121*f* and 122*f* with its positive pulses. If it be assumed that the energization of all three of signal sources SS–1 to SS–3 inclusive is required to overcome the bias and drive the core to negative remanence, the next positive pulse from source PP, flowing through coil 120*f* will induce potentials in all of the secondary windings on the core 120. Cores 121 and 122 may operate in similar manner, although it is not necessary that all three cores have similar input circuits. They could be all similar or they could be similar to Figure 4 where the bias is positive. Any combination of these arrangements is possible. If it be assumed that any one of the three cores has outputs, then the potential in coil 120*g*, 121*g* or 122*g*, as the case may be, will energize load #1, Similarly, the potentials in coils 120*h*, 121*h* and 122*h* will add to each other, but will not overcome the potential of battery 123 and will not therefore cause a flow of current in load #2. Battery 123 may be equal to the potential normally induced in one of the three coils 120*h*, 121*h* or 122*h*, or alternatively, it may have a potential equal to that induced in two of the said coils, and in the latter case it is necessary that all three of said coils be energized before there will be a flow of current in load #2. The potentials of coils 120*j* and 120*k* are additive, but are opposed to the potentials of coils 121*j* and 122*j*. Hence, when all three cores are producing outputs, there is no current in load #3. When loads #1 and #2 are concurrently energized, this is an indication that all or enough of the signal sources are in proper condition to cause all three cores to produce outputs.

If it be assumed that battery 123 is equal to the potential of two of the three coils to which it is connected, the device will operate as follows. If load #1 is energized it is known that at least one of the three magnetic gates is producing an output. If load #2 is not energized, it is known that all three gates are not concurrently producing an output. If load #1 and load #3 are concurrently energized, it is known that one or the other of cores 121 and 122 is producing an output, but that core 120 is not. By expanding the circuit according to principles well known to those skilled in the art, it is possible to give any desired indication of the condition of the three cores.

Figures 10 and 12 show gating on both the input and the output. That is, there are two or more input coils on each core, with each input coil on a given core being controlled by a different input circuit. There may also be two or more output coils on each core, with each output coil on the core being connected in a different output circuit. For example, in Figure 10 the cores 100 and 101 have output coils 100*f* and 101*f* connected to one load. Output coils 100*g* and 101*g* could connect together and to another load. Alternatively they could connect to separate loads. Any combination could be employed for the output coils, as for example coil 100*g* could be connected in circuit with one or more of coils 106*g*, 107*g* and 108*g*, or with some other coil of any gate in the whole computer. As a result, there is wide flexibility in available design and the system may perform an extremely wide range of functions depending on the connections employed. Similarly, in Figure 12 coils 120L, 121*k* and 122*k* may be connected in independent circuits of the computer or data translating system to perform even further functions.

Figure 13:
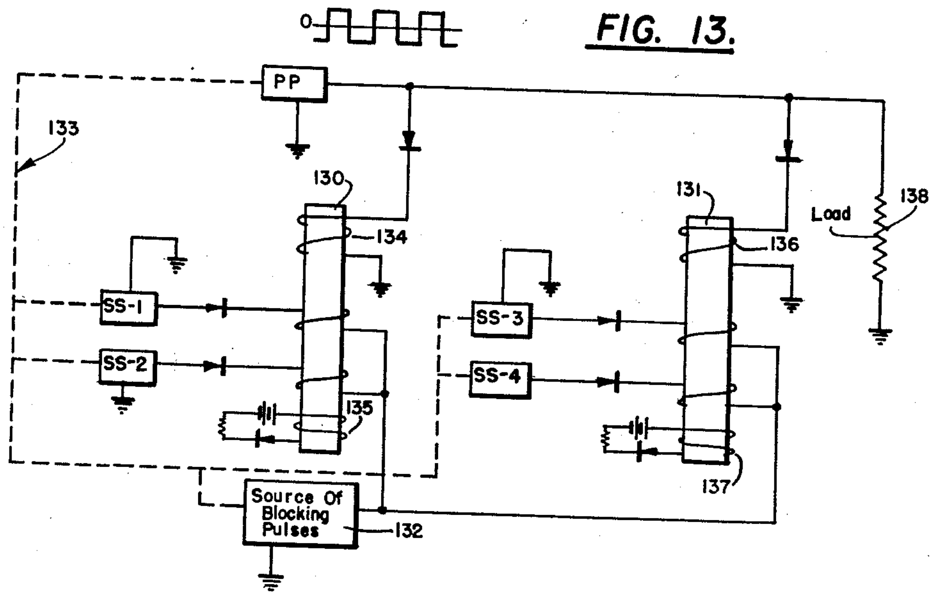
Figure 13 is a schematic diagram of a modified form of the invention.

In Figure 13 there are two gating elements 130 and 131 such as shown in either Figure 2 or Figure 4. These gating elements have their input coils controlled by signal sources, and, as shown, there is a source of blocking potential 132 connected in series with each input coil and which goes positive during the negative excursions of source PP so as to block flow of current in the input coils due to the bias circuits during the signal pulse period. Each signal pulse in this case is synchronized by means 133 so that it emits its pulses only during the negative excursions of source PP. Core 130 has a power winding 134 and a biasing winding 135. Core 131 has a power winding 136 and a biasing winding 137. The bias may be in accordance with Figure 4, and the input windings must be so wound as to cooperate with the biasing windings and to thereby achieve the desired result. When the core 130 is at negative remanence at the beginning of a given positive pulse from source PP, that pulse will drive the core 130 along an unsaturated portion thereof and coil 134 will have high impedance. Core 131 would operate in a similar way. When both coils 134 and 136 have high impedance, current may flow directly from the source PP to the load 138. On the other hand, if either of the cores is at positive remanence at the beginning of any positive pulse from source PP, that pulse will drive that core quickly to saturation and its coil, for example coil 134, will have low impedance. When coil 134 has low impedance, current from source PP is shunted directly through coil 134 to ground and the coil 134 in effect constitutes a short-circuit across the load 138, and there is no output. Hence, the condition for output in this case is that both cores be at negative remanence prior to the beginning of any given power pulse from source PP. This condition is controlled by the signal sources in cooperation with the biasing means (135 or 137 as the case may be), all as described in connection with Figures 2 and 4.

Figure 14:
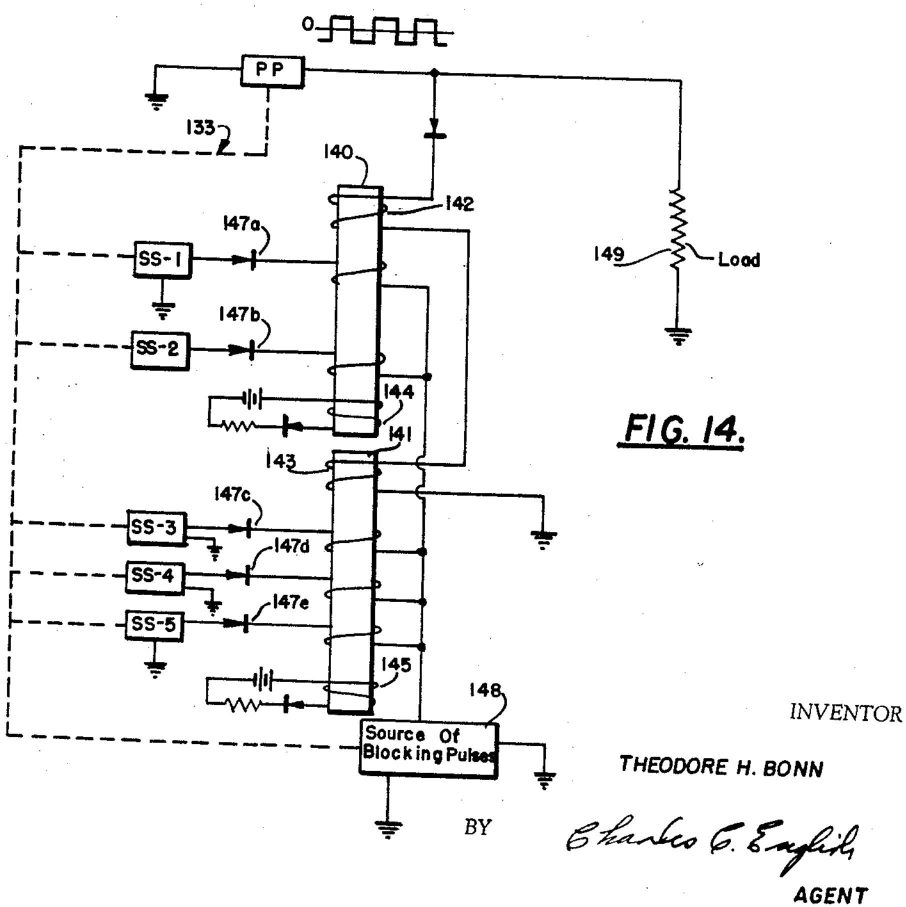
Figure 14 is a schematic diagram of another modified form of the invention.

Figure 14 is a circuit similar in many respects to Figure 13 except that the power windings 142 and 143 on the cores are in series with each other instead of in parallel with each other. The core 140 of Figure 14 has a power winding 142, suitable input windings respectively connected to the two signal sources SS–1 and SS–2, and a suitable biasing winding 144 which may cooperate with the input windings in the way described in conjunction with Figure 4 of this application. The core 141 has a power winding 143, three input windings respectively cooperating with the three signal sources SS–3 to SS–5 inclusive and a biasing winding 145 which cooperates with the input windings in the same way described in conjunction with Figure 4.

Whenever the input windings plus the biasing means revert either of the cores to negative remanence at the beginning of any given power pulse, that power pulse will drive such core from negative remanence along an unsaturated portion and consequently the power winding (142 or 143 as the case may be) will have high impedance and current may then flow directly from the source PP to the load 149. On the other hand, if both coils 142 and 143 have low impedance to any given power pulse, they will short-circuit the load 149 and substantially all of the current will flow through the coils 142 and 143 to ground. Signal pulses occur only during periods when source PP goes negative. Any suitable means 133 may connect the source of pulses to the signal sources to insure that the latter emits signals only during negative excursions of source PP. Suitable means in this regard are shown in my aforesaid prior copending application.

In the absence of blocking pulse source 148, a flow of current in reverting coils 144 and 145, while source PP was going negative, might induce potentials in the input windings which would adversely affect the signal sources. If it is desired to eliminate such adverse flow of current in the input circuits, source 148 may go positive synchronously with each negative excursion of source PP, thereby preventing the cathodes of rectifiers 147*a*–147*e* inclusive from going negative.

Any of the circuits above described may act as a magnetic gate or a magnetic buffer depending on its use in the computer, or data translating circuit. Consequently, to avoid repetition, the devices are referred to as magnetic gates. A magnetic gate is usually defined as a device where there is a signal output at the load only when there are predetermined inputs at all of the signal sources of the device. For example, if all the signal sources had signals thereon occurring concurrently, and if this produced an output at the load, the device would be acting as a gate. The device would be acting as a buffer if a signal (or the lack of a signal) at any one of the signal inputs appears at one of the output connections in complemented or non-complemented form without appearing at any other signal input. By suitable connections to the circuit, the devices hereinabove described may act as either gates or buffers; and to avoid complexity of the description, they were hereinabove and will hereinafter be referred to in the appended claims as magnetic gates. The term "gate" is therefore given a broad meaning so as to cover either a gate or buffer.

As explained in connection with Figures 7 and 10, suitable means bearing reference numbers 80 to 89 inclusive may be employed to limit the rate of change of flux in the cores. Such means may be added to any or all of the cores shown in the various figures of this application.

I claim to have invented:

1. In a system of magnetic gating, a load, a magnetic core, a plurality of windings on the core, a plurality of said windings being input windings, a plurality of signal sources respectively connected to said input windings to energize the latter, at least one of said windings being an output winding, said load being series connected to said output winding, means including a source of spaced energization pulses connected in series with said output winding and said load for energizing the load depending upon the rate of change of flux in the core, and biasing means connected to one of said windings to require predetermined conditions of a given number of the signal sources in order to give an output at the load.

2. In a system of magnetic gating, a magnetic core, a plurality of input windings on the core, a plurality of signal sources respectively connected to said input windings for energizing the same with signal pulses, means for applying a biasing magnetizing force to the core in a direction opposite to the magnetizing forces produced by some of said signal sources, an output winding on said core, a load connected in series with said output winding, and means including an energization source connected in series with said output winding and load for delivering current to the load via said output winding depending on the variations in flux in said core.

3. In a system of magnetic gating, a saturable core, a plurality of output windings linked to said core, a plurality of loads, means for applying pulses of magnetizing force to the core and for giving an output depending on which region of its hysteresis loop the core operates during the periods of said pulses, said means including an energization source, means connecting said energization source in series with at least one of said output windings and at least a first one of said loads, means connecting a second one of said loads across another of said output windings, means including a plurality of input windings on the core for reverting the core in a direction opposite the effect of said magnetizing forces during the spaces between the pulses of magnetizing force, and biasing means for applying a magnetizing force to the core tending to cancel the effect of one of said input windings when the latter is energized, said input windings being controlled by separate signals so that a plurality of such separate signals must occur concurrently in order to revert the core.

4. In a system of magnetic gating, a saturable core, a power winding on the core, a load, a source of spaced pulses in series with said power winding and said load whereby current is delivered from the source to the load when the power winding has low impedance and current is not delivered from the source to the load when the power winding has high impedance, a plurality of input windings on the core for determining the point on the hysteresis loop to be assumed by the core prior to the start of each of said pulses, and biasing means for applying a magnetizing force to the core tending to cancel the effect of one of said input windings when the latter is energized.

5. In a system of magnetic gating, a saturable core, a power winding on the core, a load in series with the power winding, a source of spaced power pulses, a circuit for connecting said source, said power winding and said load in series, means applying a biasing magnetizing force to the core in a direction opposite to that of the magnetizing force produced by the power winding, a plurality of input windings, and a plurality of signal sources respectively connected to said input windings, a given number of said input windings being required to be concurrently energized in order to overcome the bias of said biasing means, said signal sources being timed to produce their signals only during the spaces between said power pulses.

6. In a system of magnetic gating, a saturable core, a source of spaced power pulses, a power winding on said core, a load, a circuit connecting said source, said power winding and said load in series, means for applying a biasing magnetizing force to the core in the same direction as the magnetizing force set up by said power winding, a plurality of input windings on the core, a plurality of signal sources respectively connected to said input windings, a given number of said signal sources being required to be energized in order to produce a magnetizing force in said input windings which will cancel the magnetizing force due to the biasing means, and the signal sources having sufficient capacity that when a predetermined number of them are energized they overcome the effect of the biasing means and revert the core in a direction opposite the one in which the power pulses drive the core, said signal sources being timed to produce their signals only during the spaces between power pulses.

7. In a system of magnetic gating, a plurality of magnetic gates each of which has a core, a plurality of input coils, biasing means for applying a biasing magnetizing force to the core opposing the effect of at least one of said coils and output means for producing an output in response to predetermined conditions of the core; a series circuit including an input coil on each core, a first source for passing current through said series circuit, means for cancelling the effect of said source to thereby prevent flow of current in said series circuit; a source of pulses and a magnetic amplifier controlling flow of pulses from the last-named source to said third-named means so that when the magnetic amplifier allows pulses to pass it they will cancel the effect of the third-named means and allow a flow of current through the series circuit; said magnetic amplifier including means for controlling the same to thereby determine the impedance which it presents to pulses from the second-named source.

8. In a system of magnetic gating, first and second groups of magnetic gates; each magnetic gate having a core, a plurality of input coils, biasing means for opposing the magnetizing forces of the input coils, and output means for producing an output depending on the condition of the core; a first series circuit including at least one input winding on each core of the first group; a second series circuit including an input winding on each core of the second group; means connecting said first series circuit and said second series circuit in parallel, and a magnetic amplifier for feeding current through said parallel connected circuits; said magnetic amplifier having a saturable core, means for applying pulses of magnetizing force to the core, and input means for controlling the reversion of the core, and an output winding in series with each of said series circuits.

9. In a system of magnetic gating, first and second magnetic amplifiers each including a core, a plurality of input windings on the core, biasing means for opposing the effect of one of the input coils, and output means controlled by the condition of the core; a series circuit including one input winding on each core; a source tending to pass current through said series circuit; and input means connected to the series circuit between the input windings of two different cores for shunting flow of current around at least one of the input windings in response to predetermined input conditions.

10. In a system of magnetic gating, a plurality of magnetic gates each including a core, a plurality of input windings, biasing means for applying a biasing magnetizing force to each core tending to cancel the effect of an input winding, and a plurality of output windings on each core; a plurality of loads; and means interconnecting said output windings and said loads in order to indicate the conditions of said cores, said interconnecting means including a source of power pulses, means connecting said source in a series circuit with one of said output windings and one of said loads, and means connecting one of said output windings on each of a plurality of said cores in a series circuit with one of said loads.

11. In a system of magnetic gating; a plurality of magnetic gates each including a core, a plurality of input windings, and output means for producing an output depending upon the condition of the core; a series circuit including one input winding of each of said magnetic gates; a magnetic amplifier having a winding in series with said circuit; said magnetic amplifier having a core and including means for applying pulses of magnetizing force to its core and also including input means for controlling the reversion of said core.

12. In a system of magnetic gating, first and second groups of magnetic gates; each magnetic gate having a core, a plurality of input coils, and output means for producing an output depending on the condition of the core; a first series circuit including at least one input winding on each core of the first group; a second series circuit including an input winding on each core of the second group; means connecting said first series circuit and said second series circuit in parallel and a magnetic amplifier for feeding current through said parallel connected series circuits; said magnetic amplifier having a saturable core, means for applying pulses of magnetizing force to the core, and input means for controlling the reversion of the core, and an output winding in series with each of said series circuits.

13. In a series of magnetic gating, first and second magnetic amplifiers each including a core, a plurality of input windings on the core, and output means controlled by the condition of the core; a series circuit including one input winding on each core; a source tending to pass current through said series circuit; and input means connected to the series circuit between the input windings of two different cores for shunting flow of current around at least one of the input windings in response to predetermined input conditions.

14. In a system of magnetic gating, the combination of a first saturable core having a substantially rectangular hysteresis loop; means for applying a biasing magnetizing force to said first core tending to saturate it in one direction, said force applying means comprising a coil on said first core, a source of current, a rectifier, and a series circuit including said coil, source and rectifier; a plurality of input coils on said first core; a plurality of signal sources for respectively energizing said input coils and applying magnetizing forces opposite to that of said biasing means; at least one of said signal sources comprising a pulse-type magnetic amplifier including a further core having a substantially rectangular hysteresis loop, the signals of some of the signal sources having such magnitudes that at least two signal sources must concurrently produce signals in order to overcome the effect of said biasing means and drive said first core along an unsaturated portion of its hysteresis loop and an output coil on said first core.

15. In a system of magnetic gating, the combination of a first saturable core having a substantially rectangular hysteresis loop, means for applying a biasing magnetizing force to said first core tending to saturate it in one direction, a plurality of input coils on said first core, a plurality of signal sources for respectively energizing said input coils and applying magnetizing forces opposite to that of said biasing means, at least one of said signal sources comprising a pulse-type magnetic amplifier including a further core having a substantially rectangular hysteresis loop, the signals of some of the signal sources having such magnitudes that at least two signal sources must concurrently produce signals in order to overcome the effect of said biasing means and drive said first core along an unsaturated portion of its hysteresis loop, an output coil on said first core, a load, a rectifier, and a series circuit connecting said load, rectifier, and output coil in series.

16. In a system of magnetic gating, first and second gate groups each including a plurality of magnetic gates; each magnetic gate having a core, a plurality of input coils linked to said core, and output means for producing an output depending on the condition of the core; a first series circuit including at least one input winding on each core of the first group; a second series circuit including an input winding on each core of the second group; and a magnetic amplifier having an output for feeding current through both of said series circuits; said magnetic amplifier having a saturable core, means for applying pulses of magnetizing force to the core, input means for controlling the reversion of the core, and an output winding in series with both of said series circuits, and means connected in each of said series circuits for limiting the current in each of said series circuits, said last named means including an impedance in said series circuit, a source of energization and a diode shunted across both said impedance and said source and poled to maintain a constant current in said impedance for all values of current in said series connected input windings below a predetermined value.

17. In a system of magnetic gating; a magnetic core; a plurality of input windings on said core; a plurality of signal sources respectively connected to said input windings; an output winding on said core; and means connected to said output winding to prevent the appearance of potential thereacross until the current induced in said winding rises to a predetermined value corresponding to that produced by the energization of a given plurality of said input windings, said last named means comprising a source of current, a resistor, and rectifier in series, with the rectifier shunted across said output winding.

References Cited in the file of this patent

UNITED STATES PATENTS

| | | |
|---|---|---|
| 2,691,155 | Rosenberg et al. | Oct. 5, 1954 |
| 2,719,962 | Karnaugh | Oct. 4, 1955 |
| 2,734,183 | Rajchman | Feb. 7, 1956 |
| 2,734,184 | Rajchman | Feb. 7, 1956 |